(12) United States Patent
Hundeby

(10) Patent No.: US 6,561,283 B2
(45) Date of Patent: May 13, 2003

(54) FRAME SUPPORT FOR TILLAGE IMPLEMENT

(75) Inventor: David R. Hundeby, Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 36 days.

(21) Appl. No.: 09/801,177

(22) Filed: Mar. 6, 2001

(65) Prior Publication Data

US 2002/0043378 A1 Apr. 18, 2002

(51) Int. Cl.$^7$ .............................................. A01B 29/04
(52) U.S. Cl. ...................................... 172/459; 172/311
(58) Field of Search ................................ 172/238, 237, 172/158, 164, 174, 439, 311, 456, 459

(56) References Cited

U.S. PATENT DOCUMENTS

| 2,675,659 A | * | 4/1954 | Kopp ........................ 172/572 |
| 3,061,018 A | * | 10/1962 | Olson ........................ 172/139 |
| 3,442,336 A | * | 5/1969 | Morkoski .................... 172/572 |
| 3,633,680 A | * | 1/1972 | Womble et al. ............. 172/456 |
| 3,692,121 A | * | 9/1972 | Kenney ........................ 16/346 |
| 4,004,640 A | * | 1/1977 | Bland ........................ 172/710 |
| 4,133,391 A | * | 1/1979 | Richardson et al. ............ 172/1 |
| 4,396,070 A | * | 8/1983 | Brandner et al. ............ 172/572 |
| 4,407,372 A | * | 10/1983 | Rozeboom ................... 172/572 |
| 4,479,554 A | * | 10/1984 | Kueker ........................ 172/311 |
| 4,724,910 A | * | 2/1988 | Wheeler ...................... 172/464 |
| 4,993,499 A | * | 2/1991 | Bourgault et al. .......... 172/294 |
| 5,181,573 A | * | 1/1993 | Almen ........................ 172/459 |
| 5,267,619 A | * | 12/1993 | Eversole ..................... 172/572 |
| 6,158,523 A | * | 12/2000 | Gengler et al. ............. 172/574 |

* cited by examiner

Primary Examiner—Robert E. Pezzuto
Assistant Examiner—Alicia Torres
(74) Attorney, Agent, or Firm—John William Stader; Rebecca L. Henkel; A. Nicholas Trausch (57) ABSTRACT

An implement is provided that includes a frame, a ground engaging roller mounted to the frame, and a suspension system that includes a spring for biasing the roller toward the ground, and a frame support member fixed to the frame above the roller. The frame support member prevents the implement from experiencing high forces when moved into the transport position or when a strong downpressure is exerted on the frame by transferring the forces through the ground working tools to the ground. The frame support member can be a rigid protrusion, a flat plate, or a rolling element. In preferred embodiments, the implement is an agricultural packer and frame support members are positioned above each roller.

19 Claims, 11 Drawing Sheets

FRAME SUPPORT FOR TILLAGE IMPLEMENT

FIELD OF THE INVENTION

The invention relates generally to implements with suspension systems adapted for travel over the ground and specifically to wing type implements that are comprised of wing sections that fold up for transport.

BACKGROUND OF THE INVENTION

Wing type packers are packers generally comprised of wing sections extending laterally and being pivotally attached to one another. These agricultural packers can include a number of wing sections extending laterally across the packer drawbar resulting in an implement extremely long in width. Therefore, it has been common practice to provide a means to fold these wing sections upwardly about a horizontal axis to provide a narrow width for transporting the implement between different locations. This wing up method for putting the implement in a transport position is accomplished a variety of ways by different manufacturers. Similarly, the packer also includes means to wing down for putting the implement in a working position.

In the prior art, it is common for the wing up and wing down operations to incur heavy forces on the packer coil subframe. These high forces are concentrated along the hinge line about which the wing sections are rotating. Generally this means the packer frame must be designed to withstand these forces over a number of years. If the packer frame is not sufficiently designed with this in mind, the packer will invariably fail over extended use.

There exists a demand by farmers for agricultural implements including packers to be efficient and economical in order for the farmer to remain competitive. Generally a packer utilizing standard parts across the whole machine as opposed to utilizing parts specifically designed to meet high forces is more economical. An agricultural packer must also prove durable during multiple occurrences of wing up and wing down operations over a number of years.

For the foregoing reasons, there is a need for a packer design that increases control during wing up and wing down operations of a packer so that the high loads during these operations are not experienced by the frame, but are transmitted through the coil down to the ground.

SUMMARY OF THE INVENTION

The present invention relates to a new frame support that prevents implement frames and parts from experiencing high forces and instead, transmits the forces through the ground working tools down to the ground. The frame support can be used in conjunction with the suspension system of any implement adapted for travel over the ground. Preferably, the invention is used in conjunction with an agricultural packer.

In accordance with one aspect of the invention, there is provided, an implement comprising: a frame; a ground engaging roller mounted to the frame; a suspension system operatively connecting the roller to the frame, the suspension system comprising a spring for biasing the roller toward the ground; and a frame support means fixed to the frame above the roller.

In accordance with one aspect of the invention, a three section agricultural packer comprised of one wing frame section pivotally attached to each side of the middle frame section and extending laterally therefrom, the wing frame section being able to wing up and wing down for putting the implement in the transport and working positions respectively, and a frame support fixed to the frame is provided.

In accordance with another aspect of the invention, a five section agricultural packer comprised of two wing sections pivotally attached to each side of the middle frame section and extending laterally therefrom, the wing frame sections being able to wing up and wing down for putting the implement in transport and working positions, and a frame support fixed to the frame is provided.

In accordance with another aspect of the invention, there is provided an agricultural packer comprising: a frame, the frame comprising a middle frame section and at least one wing frame section pivotally attached and extending laterally from the middle frame section; a hitch affixed to the middle frame section; at least one transport wheel rotatably attached to the middle frame section; at least one packer coil mounted on each frame section; means for pivotally lifting the wing frame section to a wing up position wherein the wing frame section is in a transport position, and for pivotally lowering the wing frame section to a wing down position wherein the wing frame section is in a working position; at least one frame support means on the frame, the frame support means being positioned above at least one of the packer coils so that the frame support means is adapted to contact the packer coil during the wing up and wing down operations.

In accordance with another aspect of the invention, there is provided an agricultural packer comprising: a frame comprising a forward lateral frame member extending laterally; a hitch affixed to the frame; at least one transport wheel mounted to the frame; multiple packer coils mounted to the forward lateral frame members, the packer coils alternating between being mounted behind the forward lateral frame member and being mounted in front of the forward lateral frame member.

In accordance with yet another aspect of the invention, there is provided an agricultural packer comprising: a frame, the frame comprising a middle frame section and at least one wing frame section pivotally attached and extending laterally from the middle frame section, each frame section comprising a forward frame member extending laterally and a rearward frame member extending laterally; a hitch affixed to the frame; at least one transport wheel mounted to the frame; at least one packer coil mounted to the forward lateral frame member of the middle frame section and at least one packer coil mounted to the rearward lateral frame member of the middle frame section; and multiple packer coils mounted to the remaining forward lateral frame members, the packer coils alternating between being mounted behind the forward lateral frame member and being mounted in front of the forward lateral frame member.

In another aspect of the invention, the frame support means is located above the roller on the wing frame sections that experience the highest loads during the wing up and wing down operations.

In another aspect of the invention, the frame support means is located above all the rollers on the frame of the packer.

In another aspect of the invention, the frame comprises multiple frame supports, each frame support positioned above each packer coil.

In other aspects of the invention, the frame support is a rigid protrusion, a flat plate, or a rolling element.

It is an advantage of this invention to prevent the forces resulting from the wing up and wing down operations of the packer to be experienced by the implement frame.

It is another advantage of this invention to transmit the forces resulting from the wing up and wing down operations of the packer to the ground.

It is still another advantage of this invention to allow the implement frame to use standard parts across the packer.

Other aspects and advantages of the invention, as well as the structure and operation of various embodiments of the invention, will become apparent to those ordinarily skilled in the art upon review of the following description of the invention in conjunction with the accompanying drawings.

DETAILED DESCRIPTION OF THE PREFERRED EMBODIMENTS

Figure 1:
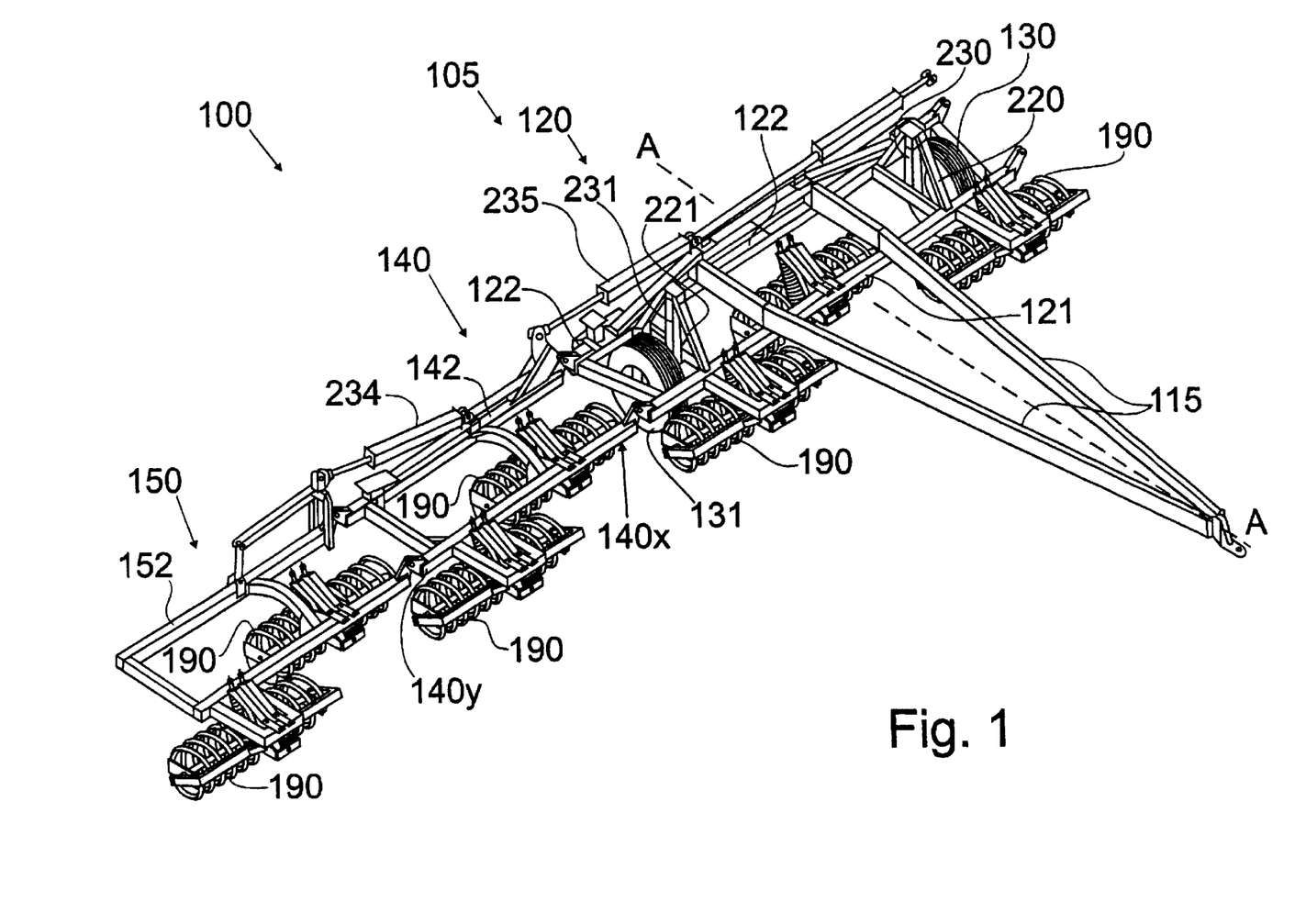
FIG. 1 is a front perspective view of a five section packer in the working position.
Figure 2:
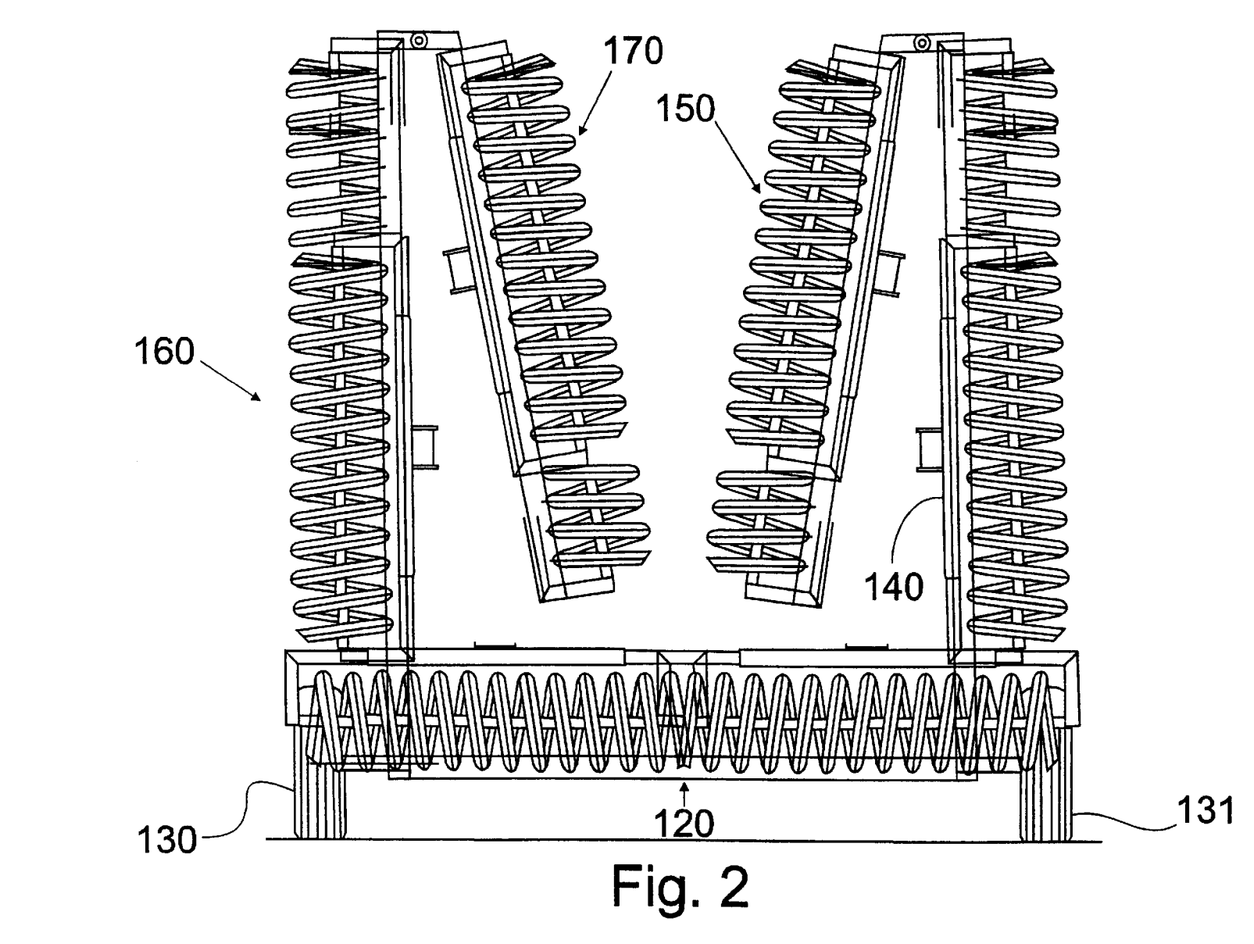
FIG. 2 is a rear view of the packer shown in FIG. 1 in the transport position.
Figure 3:
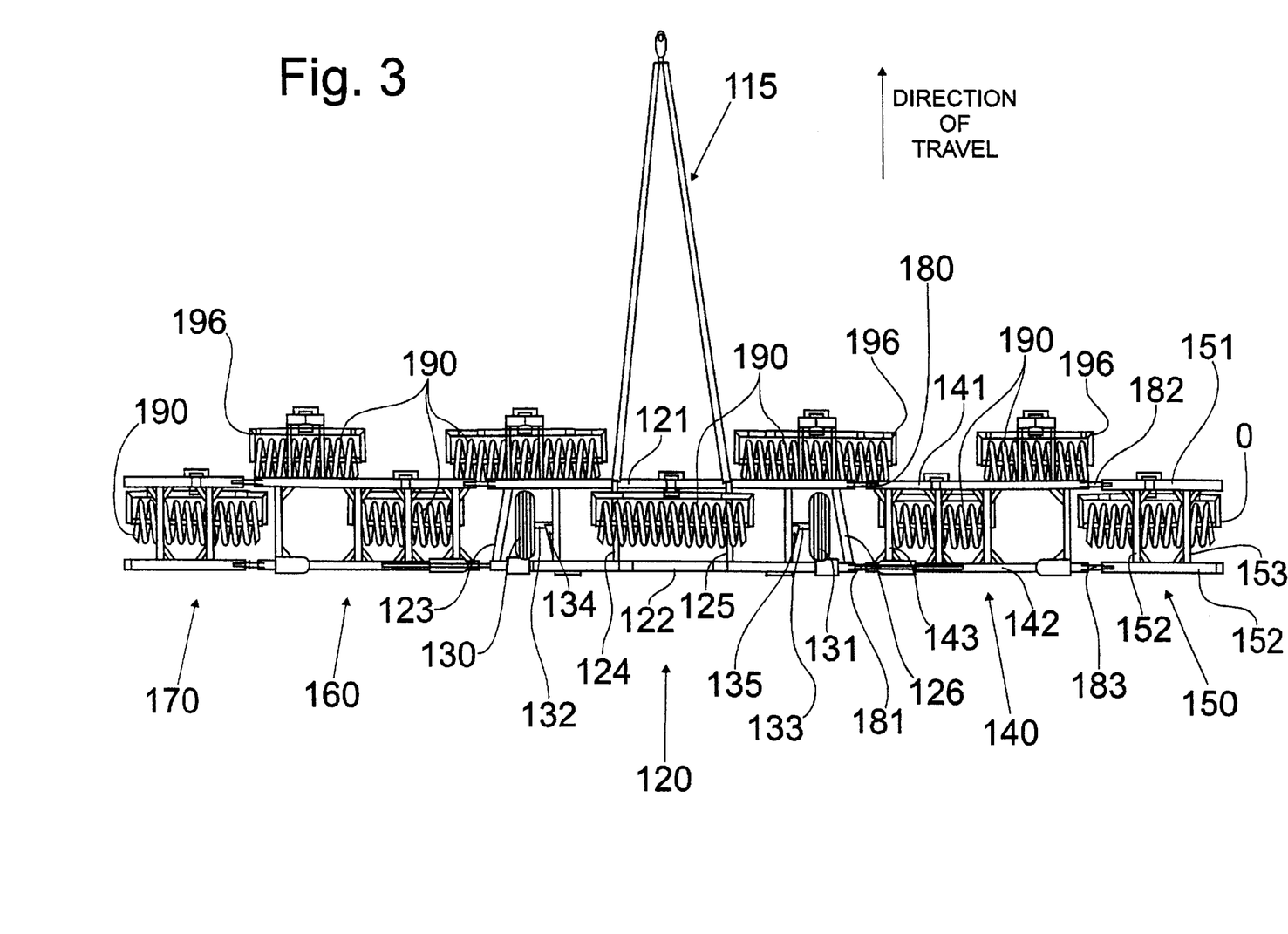
FIG. 3 is a top plan view of the embodiment shown in FIG. 1.

FIGS. 1–7 show what is generally referred to as an agricultural packer 100. As seen in FIG. 3, generally, packer 100 includes a frame 105 divided into a middle frame section 120 and a pair of inner wing frame sections 140, 160 extending laterally from either side of the middle frame section. Some packer designs may further include an additional pair of outer wing sections 150, 170 extending laterally on either side from the first pair of wing sections. FIG. 1 shows only the middle frame section 120 and two wing frame sections 140, 150 extending laterally therefrom. Wing frame section 140 includes an inner end 140x toward the middle section and an outer end 140y toward outer wing section 150.

It will be understood that the other half of the implement comprised of wing frame sections 160 and 170 is the mirror image along axis AA. It should also be noted that the invention is described in conjunction with a five section packer, the invention can readily be adapted to smaller and larger packers.

A towing hitch 115 extends from the middle frame section 120 for towing the implement behind a power source (not shown) such as a tractor.

Mounted to the frame 105 are rollers 190. In this case the rollers are packer coils. The packer coils traverse the ground as the implement is pulled by the power source and pack the soil over which they are pulled. This results in a reduction in moisture loss from the soil and also breaks down any clods present in the soil. The packer can be used singly or in conjunction with another implement, such as a cultivator or air seeder.

Transport wheels 130, 131 are also mounted to the middle section 120 to facilitate transport of the implement when the wing sections are in the wing up position.

The implement also includes hydraulic cylinders to facilitate the wing up and wing down operations as is detailed below.

As seen in FIG. 3, the middle frame section 120 comprises forward and rearward laterally extending frame member 121, 122 rigidly attached by joining members 123, 124, 125, 126. In a similar fashion each wing section also consists of a forward and rearward laterally extending frame member rigidly attached by joining members. For the sake of clarity, only the wing frame sections of FIG. 1 will be described in detail. As seen in FIG. 3, inner wing section 140 includes lateral frame members 141, 142 rigidly attached by joining members 143, 144. Outer wing section 150 includes lateral frame members 151, 152 rigidly attached by joining member 153.

Each wing section including the middle section is attached to one another by a hinge. Hinge 180 connects lateral frame members 121 and 141, hinge 181 connects lateral frame members 122 and 142, hinge 182 connects lateral frame members 151 and 141, and hinge 183 connects lateral frame members 152 and 142. The axis formed by each hinge is parallel to the direction of travel and is the axis each wing section rotates about for the wing up and wing down operations.

The transport wheels 130, 131 are each mounted to the middle section 120 and can rotate freely about axles 132, 133 respectively. Fixed axles 132, 133 are affixed to the lower end of the wheel support members 134, 135 respectively. Wheel support members 134, 135 are pivotally attached by their upper ends to the rearward laterally extending frame member 122.

Figure 6:
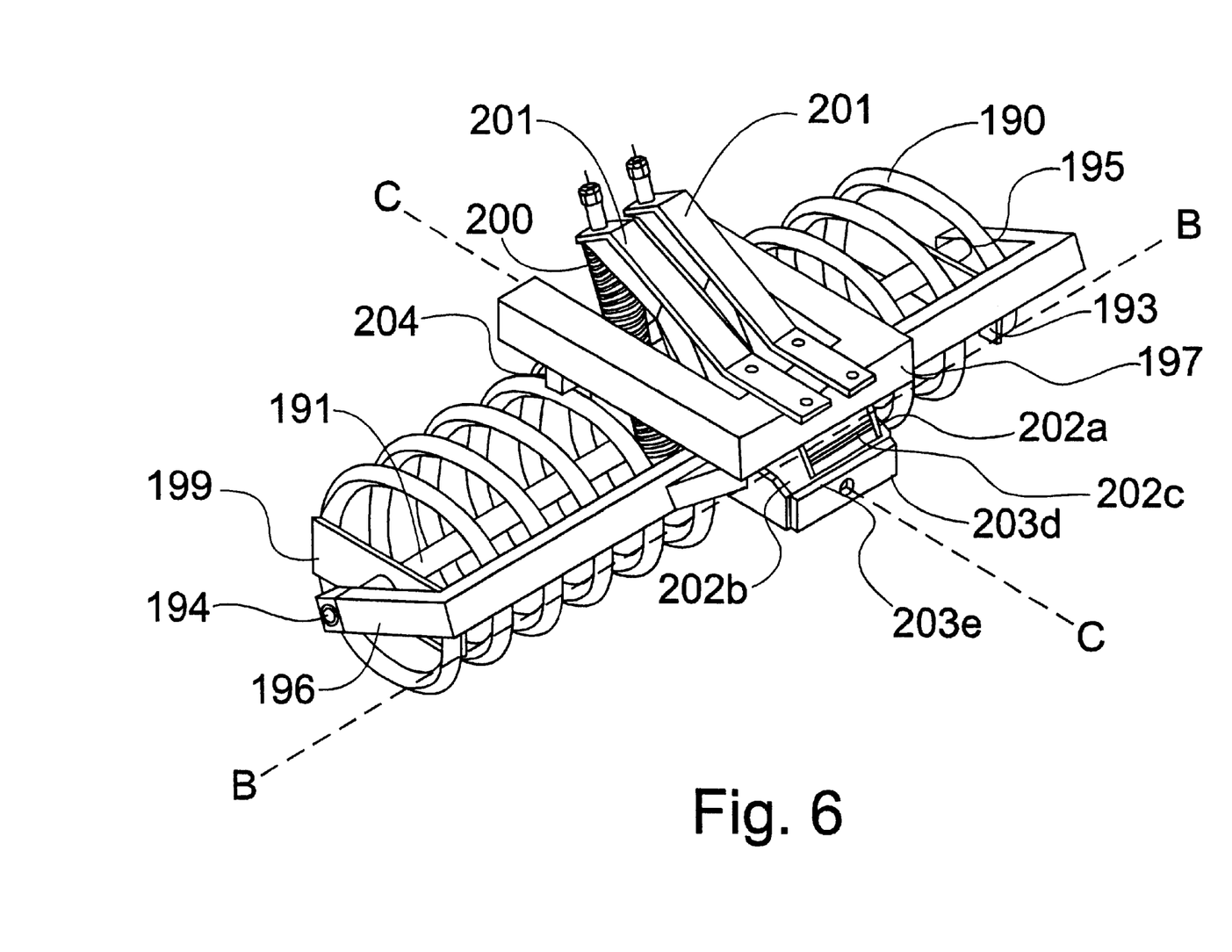
FIG. 6 is a front perspective view of the roller of FIG. 5.

Attachment of the roller to the frame can be done in a number of ways. In the preferred embodiment, the roller is a packer coil. As seen in FIG. 6, the packer coil 190 is of spiral shape as is common in the art. The packer coil subframe comprises an axle 191 affixed to either end of the packer coil 190 by end plates 192, 193. The ends of axle 191 are rotatably engaged in bearings 194, 195. The bearings 194, 195 are affixed to either end of roller support member 196.

The packer coils may be all mounted to the respective frame similarly and include similar suspension systems. For the sake of clarity, the mounting and suspension system of packer coil 190 to lateral frame member 141 will be detailed. It should be noted that the mounting and suspension system of the packer coils can be done in a number of different ways.

Figure 4:
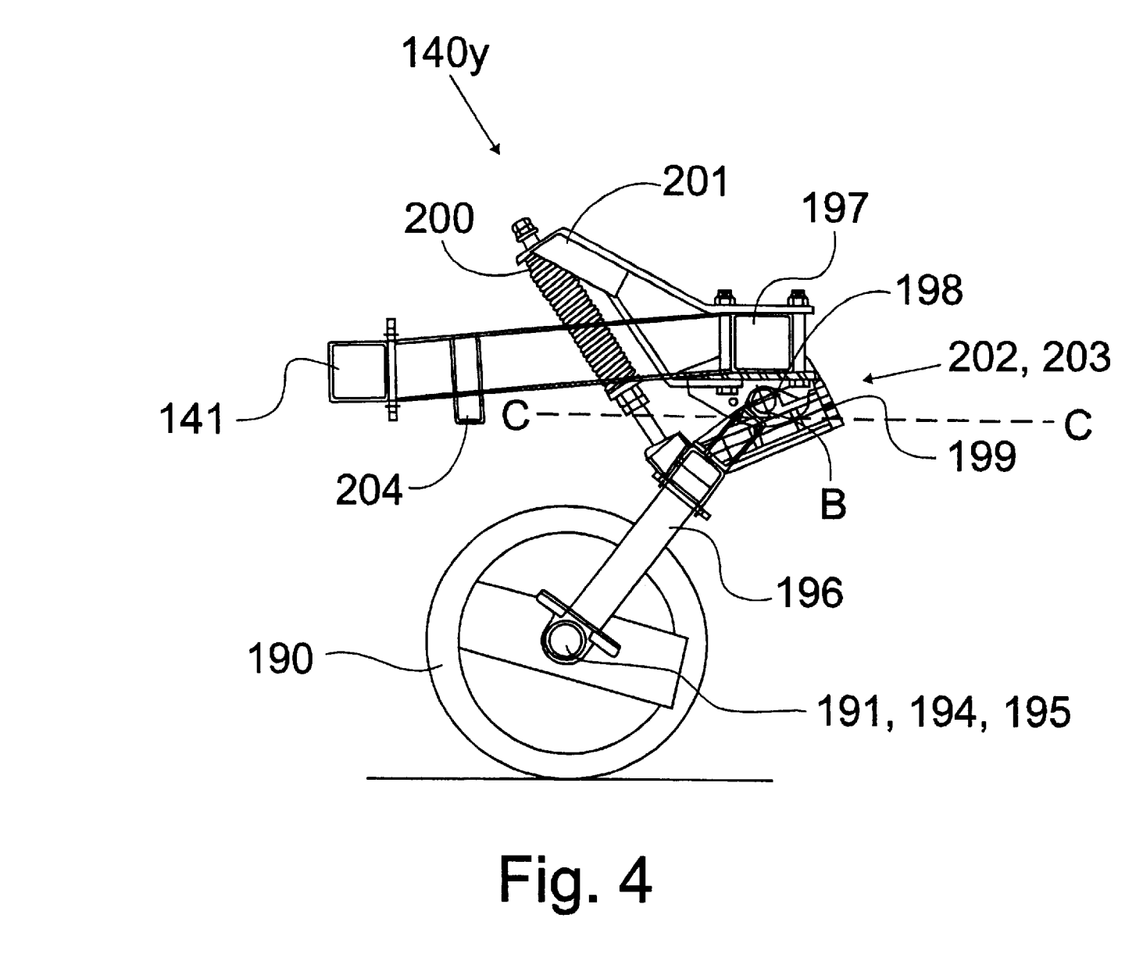
FIG. 4 is a close up side view of the packer coil in both the working and transport positions.
Figure 5:
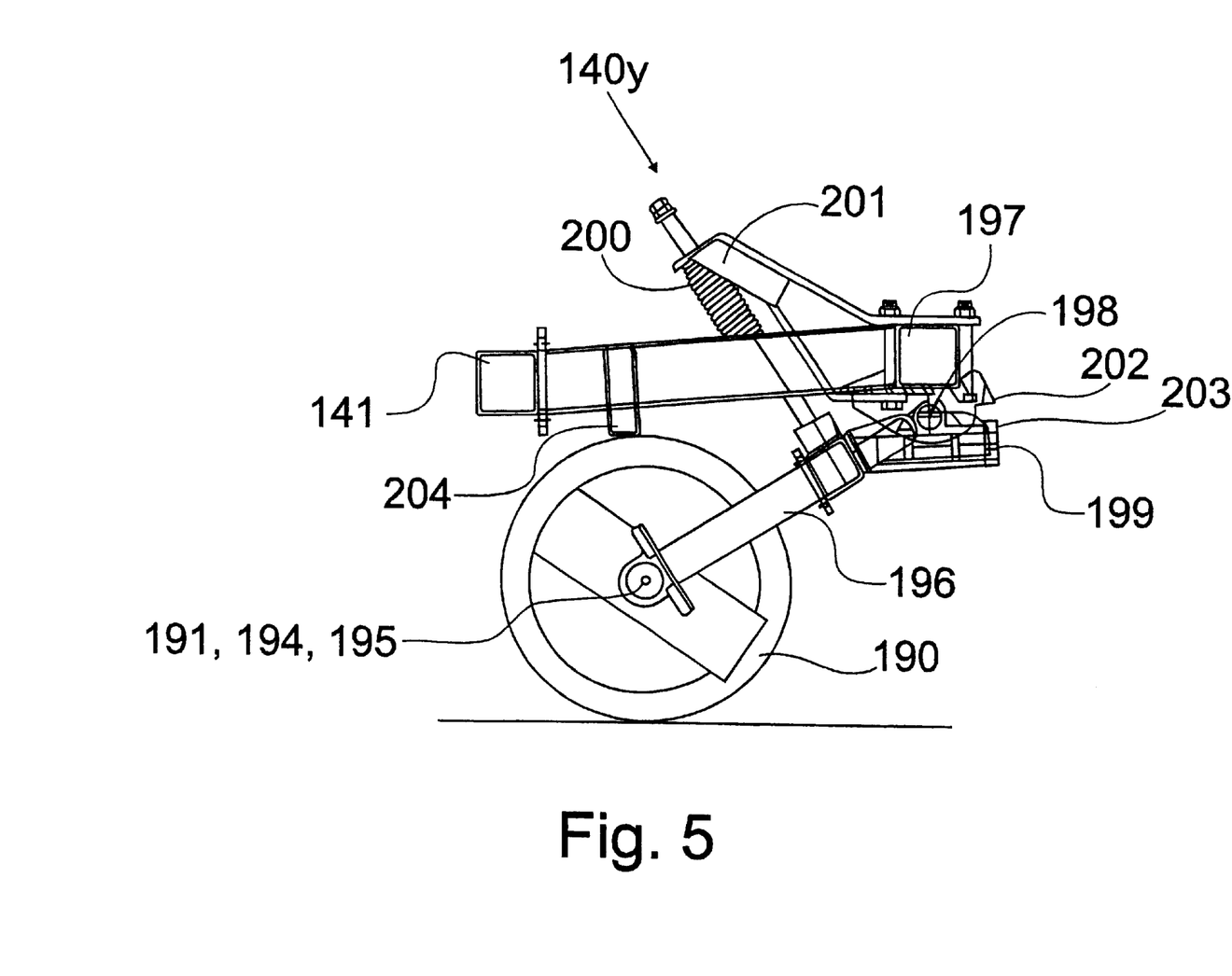
FIG. 5 is a similar view to that of FIG. 4 except with the packer coil in the transition position between the working and transport positions.

As seen in FIGS. 4, 5 and 6, roller support member 196 is affixed to lateral frame member 141 by means of two mutually perpendicular axes BB and CC. Axis BB is defined by roller pivot 198 and is parallel to the ground and perpendicular to the direction of travel. Axis CC is defined by pivot member 199 and is parallel to the direction of travel. These axes permit the packer coil 190 to pivot obliquely relative to lateral frame member 141 as it trails behind mount 197 thereby avoiding damage to the packer coils or wing frame sections. Spring 200 is pivotally attached to roller support member 196 and to plate 201. The tightness of the spring is such to bias the packer coil downwards. To limit the downward rotation about BB, stop members 202, 203 are used. Stop member 202 is rigidly attached to roller pivot 198 and mount 197, while stop member 203 is rigidly attached to roller pivot 198 and pivot member 199. In the preferred embodiment, stop member 202 comprises a left plate 202a and right plate 202b attached to mount 197 and rigidly attached to one another by bar 202c. Stop member 203 preferably is a bar 203d with an upper surface 203.

Figure 11:
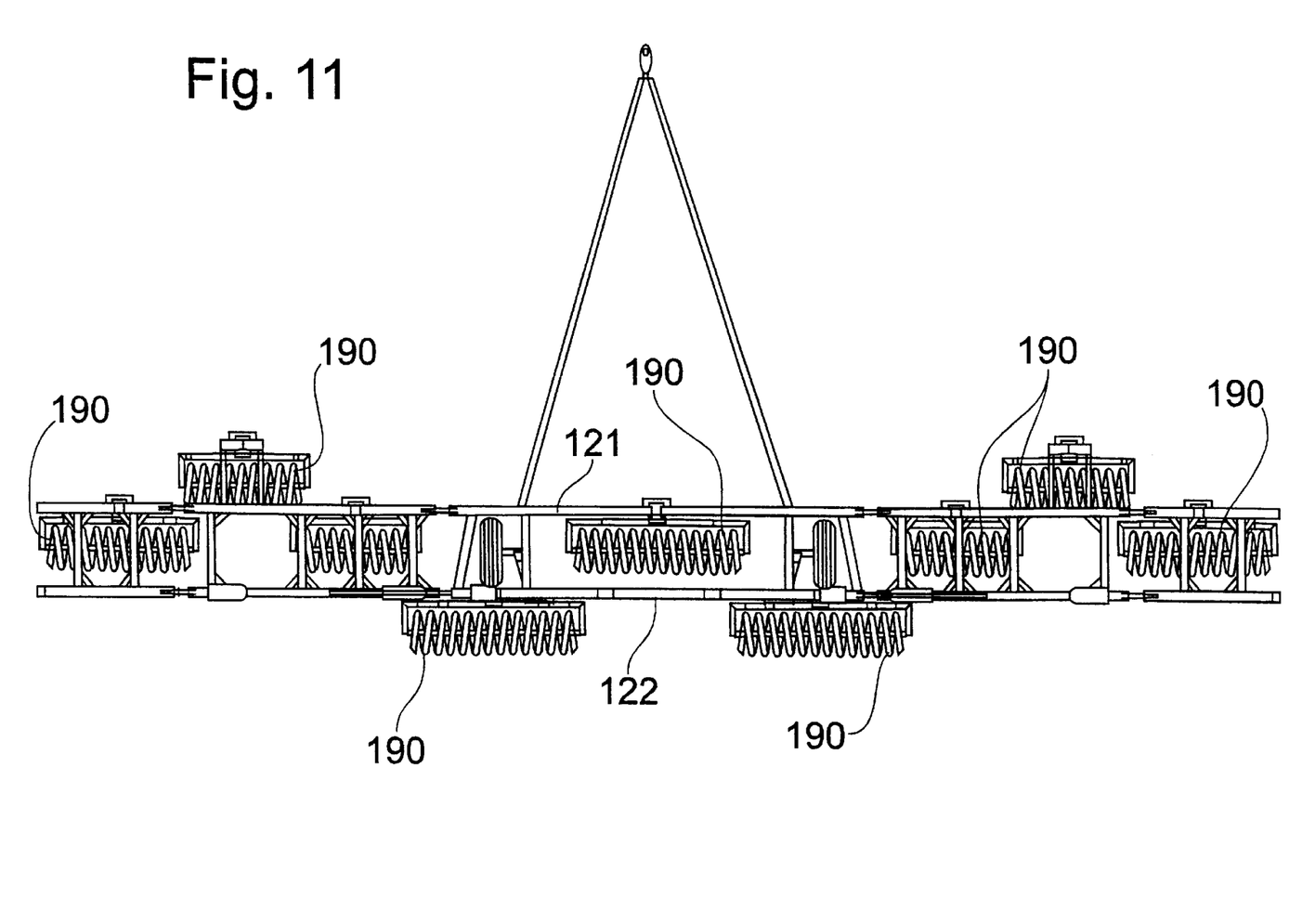
FIG. 11 is of the same view of FIG. 3 illustrating a different embodiment of the implement.

Multiple packer coils are mounted to the wing frame sections. The layout in which the packer coils are mounted is varied. One embodiment is shown in FIG. 1 wherein the packer coils are mounted to the forward lateral frame member of each wing section 121, 141, 151, alternating between being placed in front of or behind the lateral frame member. The packer coils are staggered and overlap so as to ensure complete packing of the soil during use. Another embodiment would be to mount the packer coils to the frame alternating between the forward and rearward lateral frame members. Another embodiment would be to include at least one packer coil mounted to the rearward lateral frame member of the middle section and at least one packer coil mounted to the forward lateral frame member of the middle section as seen in FIG. 11. Alternately, the packer coils could be mounted to the implement frame in any fashion deemed suitable.

In another embodiment, the individual packer coils could be replaced with a gang of packers for mounting to the frame.

As seen in FIGS. 4, 5 and 6, spring 200 of the suspension system applies pressure to member 196 to force the packer coil 190 downward relative to frame 141 against stops 202, 203 in the working position. During use, individual packer coils can ride up over obstacles by virtue of axes BB and CC. Spring 200 can also raise the wing frame sections 140, 150, 160, 170 to follow the ground contours and obstacles in the field.

The nature of stop members 202, 203 also limits the vertical rotation of the packer coil in the transport position. As shown in FIG. 4, spring 200 pivots about roller pivot 198 until stop member 203 is in contact with stop member 202. Stop members 202, 203 also have width to support the packer coil 190 and prevent rotation about CC when in the wing up position.

The implement frame further includes a frame support means 204 rigidly attached thereto as seen in FIGS. 4, 5 and 6. The location of 204 is such that the packer coil 190 comes in contact with frame support means 204 when a sufficient predetermined vertical force is applied to the frame, such as the forces applied during the wing up and wing down operations of the packer. In the current example, frame support means 204 is shown in FIGS. 4 and 5 to be fixed on the outer end of wing frame 140y.

As is common in the art, hydraulics are used to facilitate the wing up and wing down operations of the implement. As seen in FIG. 1, a first pair of hydraulic cylinders are lift cylinders 230, 231 attached between wheel support members 134, 135 to frame members 220, 221 respectively. Activation of lift cylinders 230, 231 lifts the middle frame section 120.

A second pair of hydraulic cylinders are wing cylinders 234, 235. Wing cylinder 235 is attached between lateral frame member 122 and lateral frame member 142. Wing cylinder 234 is attached between lateral frame member 142 and lateral frame member 152. Both wing cylinders are pivotally attached to their respective lateral frame members. Wing cylinders 234, 235 and hinges 180, 181, 182, 183 permit the wing up and wing down operations as detailed below.

In the preferred embodiment, to convert the implement to the transport position as shown in FIG. 2, the forward travel of the implement must be stopped. Then, hydraulic cylinders 230, 231, 234, 235 are actuated. All cylinders are free to communicate oil such that the operation that requires the lowest pressure will be accomplished first. Cylinders 230, 231 are actuated to pivot the middle frame section 120 upward with respect to ground engaging wheels 130, 131. This lifts the packer coils mounted to middle frame section 120 upward out of contact with the ground and from the position shown in FIG. 4 to the position shown in FIG. 5. To a limited extent, the wing sections are also raised as the middle frame section is lifted.

In another embodiment, the frame support 204 could be a rolling element. This would allow the implement to be winged up and winged down while the implement is still moving forward.

Hydraulic cylinders 235, 234 then act on wings 140, 150 respectively pivoting the outer wing section 150 upward about a horizontal axis. The similar operation is carried out on the mirror image of the implement to pivot outer wing section 170 upward.

Figure 7:
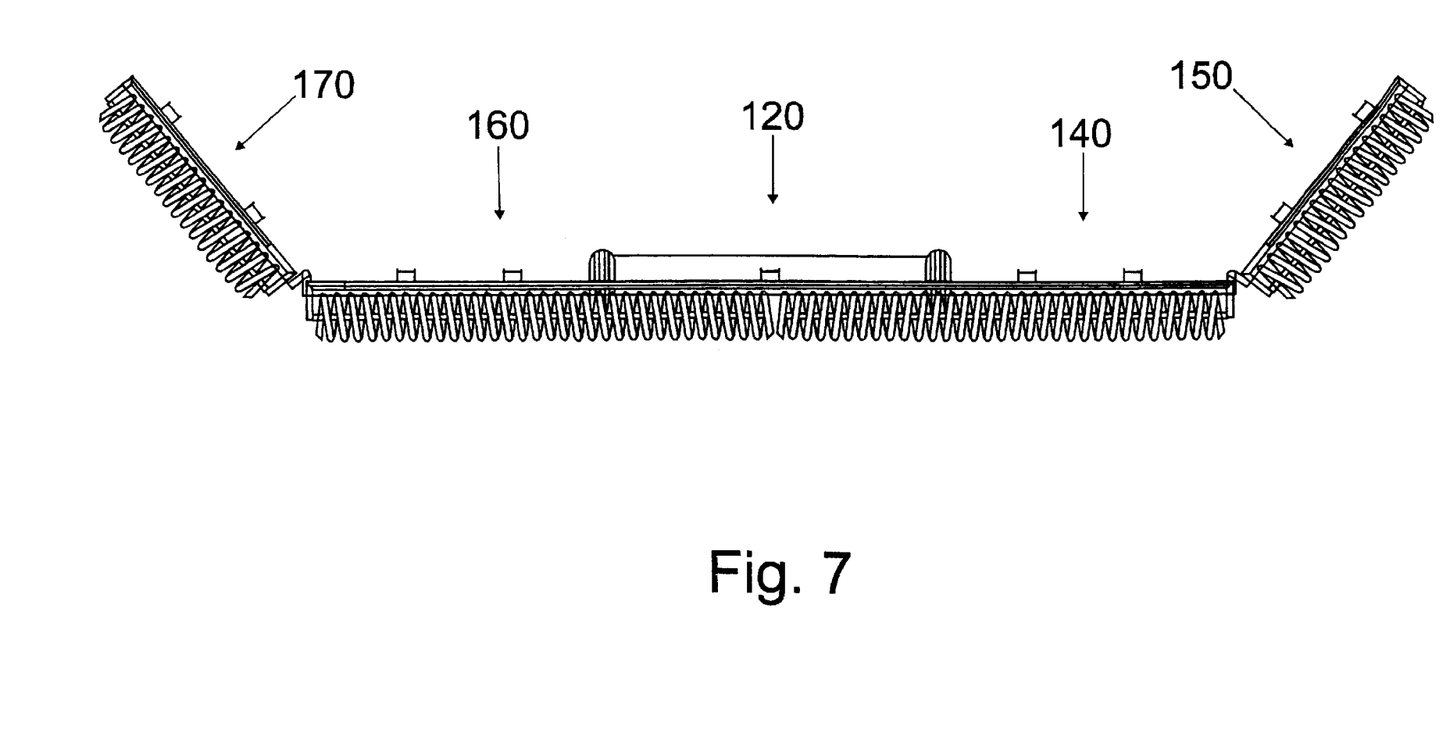
FIG. 7 is a rear view of the packer shown in FIG. 1 in the transition position of FIG. 5.

When the outer wings 150, 170 are in the transition position shown in FIG. 7, extremely high forces are required to support the outer end of wings 140, 160. As wings 150, 170 are raised to the position shown in FIG. 7, the springs 200 are compressed to allow rotation of the frame 196 upwards towards element 204 as shown in FIG. 5. When element 204 contacts coil 190, the high forces are transmitted from frame 140 directly to the packer coil 190. Preferably, packer coil 190 is a very strong member. The high forces need not be transmitted through the packer implement, as especially through the packer subframe. Further actuation of the wing cylinders will move the packer into the full transport position shown in FIG. 2. The packer is then in transport position, for towing on roads or across fields.

To convert the packer back to the working position, the cylinders are actuated in the reverse direction to lower the wings 140, 150, 160, 170 and to lower packer coils 190 into contact with the ground and from the position shown in FIG. 5 back to the position shown in FIG. 4.

Alternatively, frame support means 204 could also be used on the middle frame section or any wing section where high loads are encountered during the wing up or the wing down operation.

Figure 8:
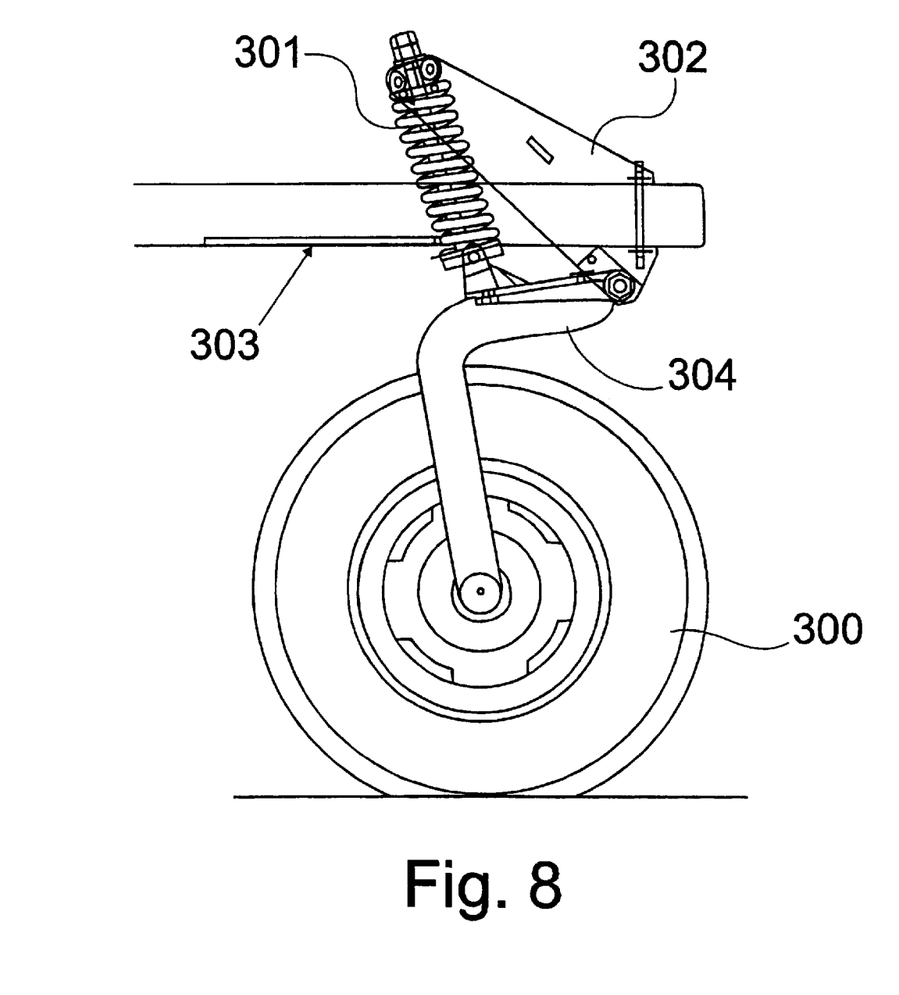
FIG. 8 shows a general roller and suspension system in the working position.
Figure 9:
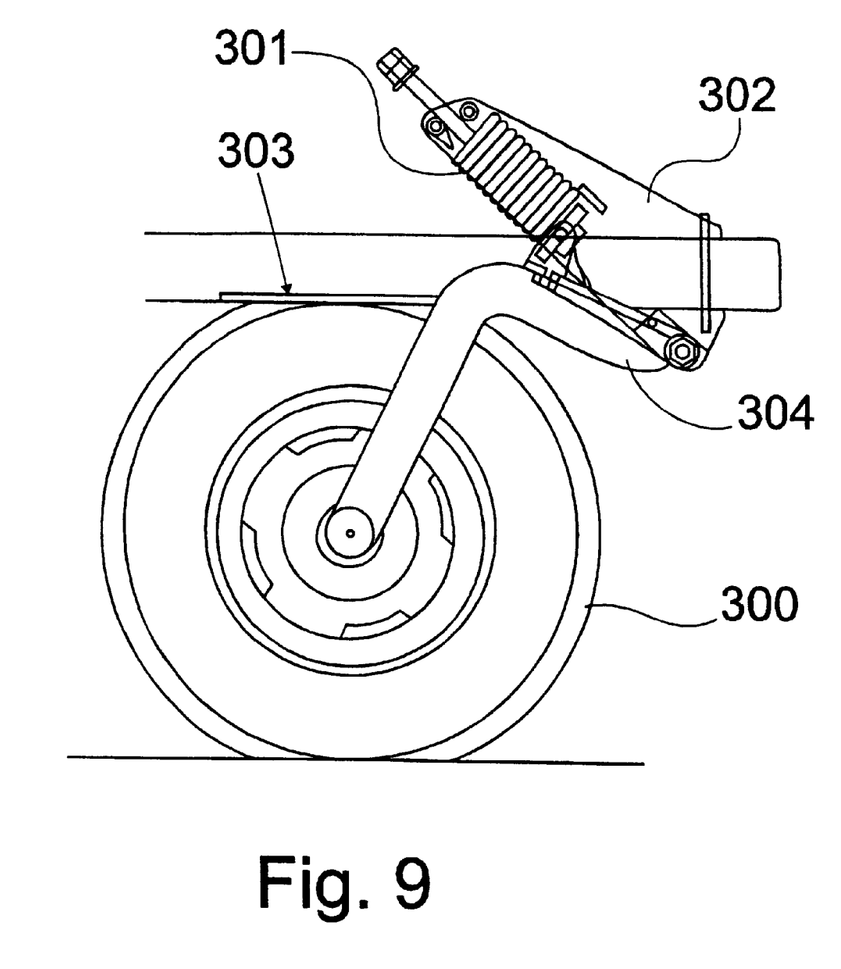
FIG. 9 shows the assembly of FIG. 8 in the transition position.
Figure 10:
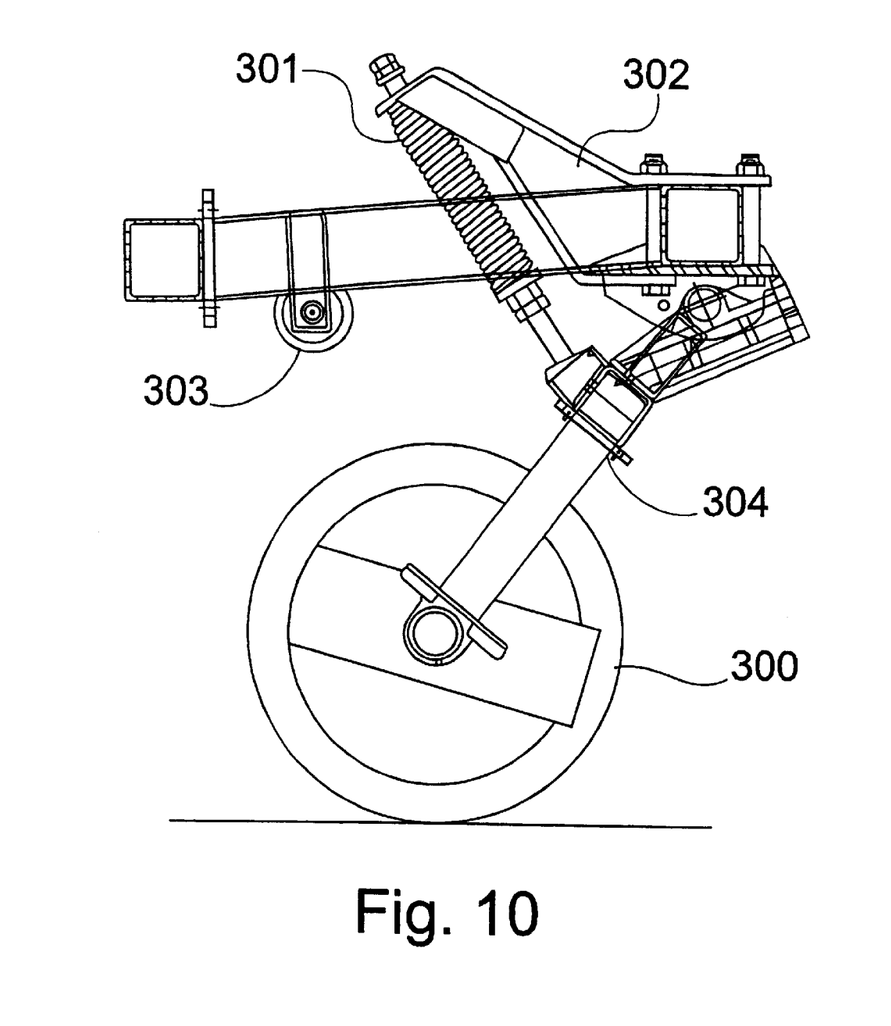
FIG. 10 shows another embodiment of a general roller and suspension system.

Thus far, the invention has been described in conjunction with an agricultural packer. However, this invention has utility in any implement adapted to travel over the ground. FIGS. 8, 9 illustrate this more general application of the invention. FIGS. 8,9 show a roller 300, which is illustrated as a wheel, pivotally attached to member 304 which in turn is pivotally attached to frame 302. Spring 301 is pivotally attached to member 304 on one end and to frame 302 on the other end to provide a suspension system to support frame 302. The spring also serves to bias the wheel 300 towards the ground. Under normal operation, the wheel 300 and the spring suspension system 301 provide adequate forces to carry the frame 302 in the position shown in FIG. 8. If, however, there is a requirement for the frame 302 to be supported when extremely high forces are applied to the frame 302, the spring 301 can compress allowing the member 304 to rotate and the frame 302 to lower to the position shown in FIG. 9. The wheel 300 comes in contact with frame support means 303 and forces are then transmitted directly through the wheel and down to the ground. This prevents excessively high forces from being transmitted through the suspension system 301. The frame support means 303 is illustrated as a flat plate, however, it could be a rigid protrusion as illustrated in FIGS. 4 and 5, or any other such suitable means. As mentioned above, it could also be a rolling element as seen in FIG. 10, thereby eliminating the need to stop the forward travel of the implement prior to winging up or winging down.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An agricultural packer comprising:
   a frame having a middle frame section and at least one wing frame section pivotally attached and extending laterally from said middle frame section;
   a hitch affixed to said middle frame section;
   at least one transport wheel rotatably attached to said middle frame section;
   at least one packer coil pivotally mounted on each frame section by a support arm to permit generally vertical movement relative to the corresponding frame section, said packer coil being rotatably mounted on said support arm;
   hydraulic cylinders respectively interconnecting said wing frame sections and said middle frame section for pivotally moving said wing frame sections between a raised transport position and lowered working position;
   at least one frame stop member on each said frame section, each said frame stop member being positioned above the corresponding said packer coil so that said frame stop member is adapted to contact the corresponding said packer coil during both said transport and working positions, said frame support member transmitting force from said frame to said packer coils when said implement is placed into said working position; and
   support arm stop members operable between the corresponding said frame section and packer coil support arm to limit the vertical movement of said packer coil relative to the corresponding said frame section.

2. The agricultural packer of claim 1, wherein said frame stop member is a rigid protrusion.

3. The agricultural packer of claim 1, wherein said frame stop member is a flat plate attached to said frame.

4. The agricultural packer of claim 1, wherein said frame stop member is a rolling element.

5. The agricultural packer of claim 1, wherein the frame stop member and packer coil are positioned on said middle frame adjacent to wing frame section being moved into said transport position.

6. The agricultural packer of claim 1, wherein said frame further comprises:
   a forward lateral frame member extending laterally along said frame; and
   each said packer coil mounted on said wing frame section is mounted to said forward lateral frame member.

7. The agricultural packer of claim 1, wherein said frame further comprises multiple frame stop members, each frame stop member being positioned above each said packer coil.

8. The agricultural packer of claim 1, further comprising a spring member pivotally connected to said frame to bias said packer coil downward relative to said frame.

9. The agricultural packer of claim 8, wherein said frame stop member contacts said packer coil when said spring collapses.

10. The agricultural packer of claim 9, wherein said at least one frame stop member and at least one of said packing coils are located adjacent the point of highest load on the frame in said transport and working positions.

11. A farm tillage implement comprising:
    an elongated transversely extending frame and a support arm pivotally connected to said frame;
    a frame stop member attached to said frame;
    a spring member interconnecting said support arm and said frame to bias said support arm away from said frame;
    a packer coil rotatably mounted on said support arm for engagement with the ground and being pivotally movable with said support arm relative to said frame to follow ground undulations, said packer coil being positioned under said frame to engage said frame stop member when said spring member collapses, said frame stop member transferring force from said frame to said packer coil when said frame stop member contacts said packer coil; and
    support arm stop members operatively associated with said support arm to limit the vertical movement of said packer coil.

12. The farm tillage implement of claim 11, wherein said frame stop member is a rigid protrusion.

13. The farm tillage implement of claim 11, wherein said frame stop member is a flat plate attached to said frame.

14. The farm tillage implement of claim 11, wherein said frame stop member is a rolling element.

15. The farm tillage implement of claim 11, wherein said support arm stop member comprises a left plate and a right plate interconnected by a bar.

16. The farm tillage implement of claim 11, wherein said spring member collapses to packer coil to contact said frame stop member when a predetermined vertical force is applied to said frame.

17. The farm tillage implement of claim 16, wherein said farm implement has a plurality of packing coils and a plurality of frame stop members positioned respectively above said packing coils.

18. The farm tillage implement of claim 16, wherein said frame stop member contacts said packer coil in both a transport and a working position.

19. The farm tillage implement of claim 15, wherein said frame stop members and packing coils are located adjacent a point of highest load on the frame in said transport and working positions.

* * * * *